US011688328B2

(12) United States Patent
Lee et al.

(10) Patent No.: US 11,688,328 B2
(45) Date of Patent: Jun. 27, 2023

(54) DISPLAY SYSTEM INCLUDING SUB DISPLAY APPARATUSES AND METHOD OF DRIVING THE SAME

(71) Applicant: Samsung Display Co., Ltd., Yongin-Si (KR)

(72) Inventors: Eunjung Lee, Yongin-si (KR); Young-Jun Seo, Suwon-si (KR); Yongwoo Yi, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/397,050

(22) Filed: Aug. 9, 2021

(65) Prior Publication Data

US 2022/0068192 A1 Mar. 3, 2022

(30) Foreign Application Priority Data

Sep. 1, 2020 (KR) .......................... 10-2020-0111313

(51) Int. Cl.
*G09G 3/20* (2006.01)

(52) U.S. Cl.
CPC ..... *G09G 3/2096* (2013.01); *G09G 2300/026* (2013.01); *G09G 2310/0267* (2013.01); *G09G 2320/0673* (2013.01); *G09G 2360/04* (2013.01); *G09G 2370/22* (2013.01)

(58) Field of Classification Search
CPC .............. G06F 3/1446; G09G 2360/04; G09G 2300/026; G09G 2300/04
See application file for complete search history.

(56) References Cited

U.S. PATENT DOCUMENTS

| 9,540,828 | B2 | 1/2017 | Rastegar et al. | |
|---|---|---|---|---|
| 9,787,937 | B1* | 10/2017 | Hung | H04N 7/0122 |
| 2003/0016189 | A1* | 1/2003 | Abe | G09G 3/20 |
| | | | | 345/55 |
| 2007/0241988 | A1* | 10/2007 | Zerphy | G06F 3/1446 |
| | | | | 345/1.3 |
| 2014/0062951 | A1* | 3/2014 | Chang | G06F 3/0442 |
| | | | | 345/174 |

(Continued)

FOREIGN PATENT DOCUMENTS

| KR | 100922116 B1 | 10/2009 |
|---|---|---|
| KR | 1020180025286 A | 3/2018 |

*Primary Examiner* — William Boddie
*Assistant Examiner* — Bipin Gyawali
(74) *Attorney, Agent, or Firm* — Cantor Colburn LLP

(57) ABSTRACT

A display system includes a display region including a plurality of sub display apparatuses and a host processor which divides source image data into a plurality of sub input image data corresponding to the plurality of sub display apparatuses, and provides the plurality of sub input image data to the plurality of sub display apparatuses. A sub display apparatus of the plurality of sub display apparatuses includes a sub display panel including a plurality of pixels and a panel driver which receives corresponding sub input image data among the plurality of sub input image data and drives the sub display panel based on the corresponding sub input image data. The host processor includes a data generator which senses information of the plurality of sub display apparatuses included in the display region and determines a number of the plurality of sub display apparatuses.

16 Claims, 7 Drawing Sheets

(56) References Cited

U.S. PATENT DOCUMENTS

| | | | |
|---|---|---|---|
| 2014/0166998 A1* | 6/2014 | Lee | H01L 27/323 257/40 |
| 2015/0356897 A1* | 12/2015 | Shin | G09G 3/3233 345/211 |
| 2020/0035134 A1* | 1/2020 | Pahlevaninezhad | H01R 13/6205 |

* cited by examiner

DISPLAY SYSTEM INCLUDING SUB DISPLAY APPARATUSES AND METHOD OF DRIVING THE SAME

This application claims priority to Korean Patent Application No. 10-2020-0111313, filed on Sep. 1, 2020, and all the benefits accruing therefrom under 35 U.S.C. § 119, the content of which in its entirety is herein incorporated by reference.

BACKGROUND

1. Field

Embodiments of the invention relate to a display system and a method of driving the display system. More particularly, embodiments of the invention relate to a display system including a plurality of sub display apparatuses and a method of driving the display system.

2. Description of the Related Art

A display apparatus such as a liquid crystal display ("LCD") apparatus or an organic light emitting diode ("OLED") display apparatus may include a display panel and a panel driver. The display panel may include a plurality of gate lines, a plurality of data lines, and a plurality of pixels connected to the gate lines and the data lines. The panel driver may include a gate driver providing gate signals to the gate lines and a data driver providing data voltages to the data lines.

In general, the LCD apparatus may include a first substrate including a pixel electrode, a second substrate including a common electrode, and a liquid crystal layer disposed between the first and second substrates. The LCD apparatus may generate an electric field in the liquid crystal layer by applying voltages to the two electrodes, and may control an intensity of the electric field to adjust a transmittance of light passing through the liquid crystal layer to display a desired image.

The OLED display apparatus may use an organic light emitting element (or referred to as an OLED) to display an image. In the organic light emitting element, holes provided from an anode electrode and electrons provided from a cathode electrode are combined in an emission layer between the anode electrode and the cathode electrode, such that the organic light emitting element may emit light.

In order to represent an ultra-high resolution image which cannot be represented in a single display apparatuses, a tiled display apparatus in which several display apparatuses are integrated may display one large image. The tiled display apparatus may include a graphic card including information of the number of the display panels and the number of the pixels.

SUMMARY

Embodiments of the invention provide a display system capable of determining a number of sub display apparatuses without a graphic card.

Embodiments of the invention also provide a method of driving the display system.

In an embodiment of a display system according to the invention, a display system includes a display region including a plurality of sub display apparatuses and a host processor which divides source image data into a plurality of sub input image data corresponding to the plurality of sub display apparatuses, and provides the sub input image data to the plurality of sub display apparatuses. A sub display apparatus of the plurality of sub display apparatuses includes a sub display panel including a plurality of pixels and a panel driver which receives corresponding sub input image data among the plurality of sub input image data and drives the sub display panel based on the corresponding sub input image data. The host processor includes a data generator which senses information of the plurality of sub display apparatuses included in the display region and determines a number of the plurality of sub display apparatuses.

In an embodiment, the data generator may include a sensing signal generator which outputs a first sensing signal in a first direction of the display region and outputs a second sensing signal in a second direction perpendicular to the first direction.

In an embodiment, the data generator further may include a counter which receives the first sensing signal the second sensing signal, calculates a voltage drop of the first sensing signal and a voltage drop of the second sensing signal and determines the number of the plurality of sub display apparatuses included in the display region.

In an embodiment, the host processor may determine the plurality of sub input image data according to the number of the plurality of sub display apparatuses.

In an embodiment, the sub display apparatus may further include a gate line which transmits a gate signal, a data line which transmits a data signal, and a pixel data generator which senses information of the plurality of pixels through the gate line and the data line and determine a number of the plurality of pixels.

In an embodiment, the sub display apparatus may determine the gate signal and the data signal according to the number of the plurality of pixels.

In an embodiment, the pixel data generator may output a first pixel sensing signal to the gate line, receive the first pixel sensing signal, calculate a voltage drop of the first pixel sensing signal, and determine a number of pixels of the plurality of pixels in the first direction of the sub display panel.

In an embodiment, the pixel data generator may output a second pixel sensing signal to the data line, receive the second pixel sensing signal, calculate a voltage drop of the second pixel sensing signal and determine a number of pixels of the plurality of pixels in the second direction of the sub display panel.

In an embodiment, the sub display panel has a shape of non-rectangle.

In an embodiment, the sub display panel of at least one of the plurality of sub display apparatuses has a shape different from the sub display panel of another sub display apparatus of the plurality of sub display apparatuses.

In an embodiment of a method of driving a display system according to the invention, the method includes sensing information of a plurality of sub display apparatuses included in a display region in a first direction and a second direction, determining a number of the plurality of sub display apparatuses, dividing source image data into a plurality of sub input image data corresponding to the plurality of sub display apparatuses and providing the plurality of sub input image data to corresponding sub display apparatuses of the plurality of sub display apparatuses. The sub display apparatus includes a sub display panel including a plurality of pixels and a panel driver which receives corresponding sub input image data among the plurality of sub input image data and drives the sub display panel based on the corresponding sub input image data.

In an embodiment, the sensing the information of the sub display apparatuses may include outputting a first sensing signal in a first direction of the display region and a second sensing signal in a second direction perpendicular to the first direction.

In an embodiment, the determining the number of the plurality of sub display apparatuses may include receiving the first sensing signal and the second sensing signal and calculating a voltage drop of the first sensing signal and a voltage drop of the second sensing signal.

In an embodiment, the method may further include determining the plurality of sub input image data according to the number of the plurality of sub display apparatuses.

In an embodiment, the sub display apparatus may include a gate line which transmits a gate signal, a data line which transmits a data signal, and a pixel data generator which senses information of the pixels through the gate line and the data line and determines a number of the plurality of pixels.

In an embodiment, the sub display apparatus may determine the gate signal and the data signal according to the number of the plurality of pixels.

In an embodiment, the pixel data generator may output a first pixel sensing signal to the gate line, receive the first pixel sensing signal, calculate a voltage drop of the first pixel sensing signal and determine a number of pixels of the plurality of pixels in the first direction of the sub display panel.

In an embodiment, the pixel data generator may output a second pixel sensing signal to the data line, receive the second pixel sensing signal, calculate a voltage drop of the second pixel sensing signal and determine a number of pixels of the plurality of pixels in the second direction of the sub display panel.

In an embodiment, the sub display panel may have a shape of non-rectangle.

In an embodiment, the sub display panel of at least one of the plurality of sub display apparatuses may have a shape different from a shape of the sub display panel of another sub display apparatus.

According to the display system and the method of driving the display system, the display system may determine the number of the sub display apparatuses by the plurality of the sub input image data lines, and may divide the source image data into the sub input image data based on the number of the sub display apparatuses.

In addition, the sub display apparatuses may determine the number of the pixels by gate lines and data lines, and determine a gate signal and a data signal according to the number of the pixels.

Accordingly, the display system may output image data to the sub display apparatuses without the graphic card and the sub display apparatuses may output the gate signal and the data signal to the pixels without the graphic card.

As a result, a manufacturing time of the display system may be shortened and the power consumption of the display system may be reduced in the display system.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
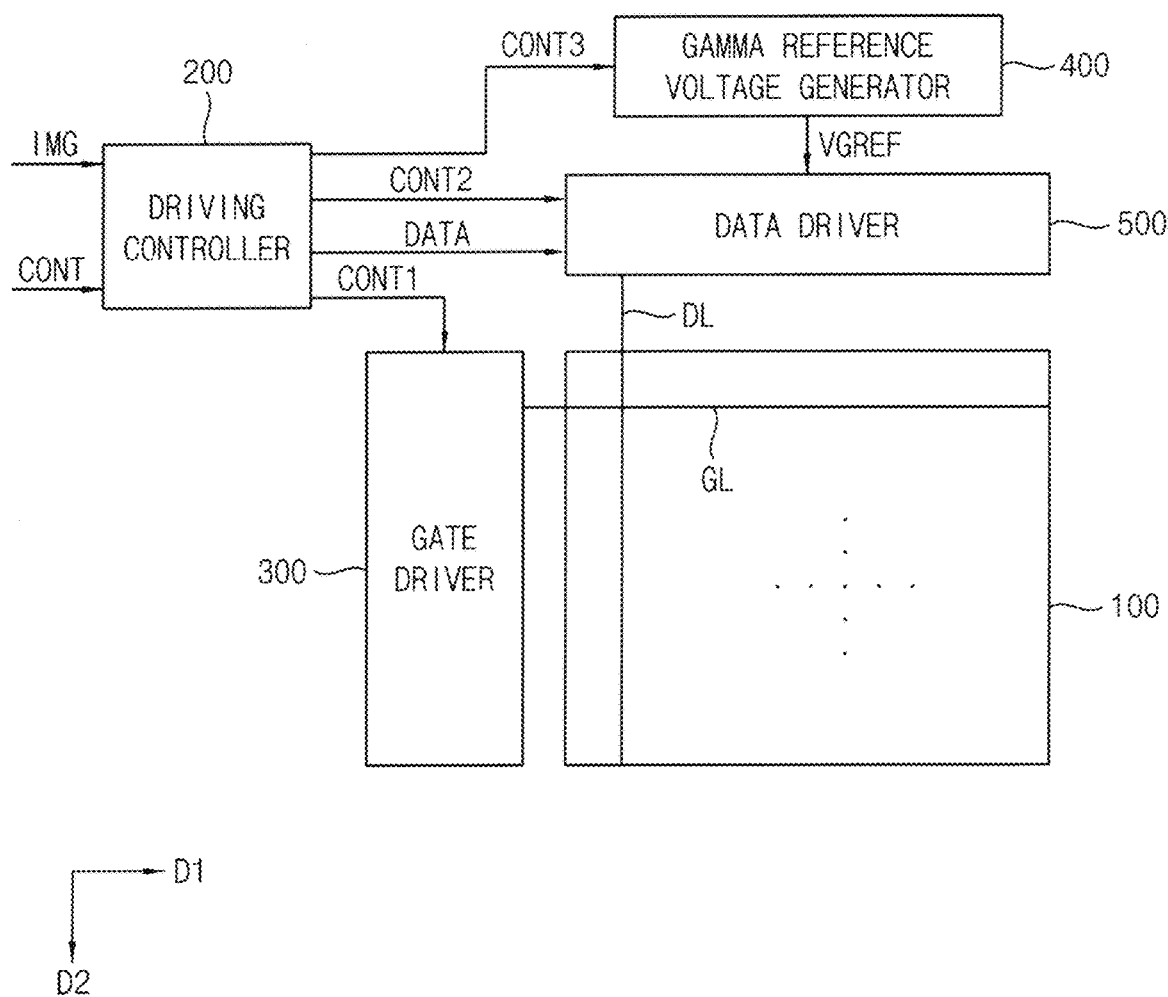
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display apparatus according to the invention.

Referring to FIG. 1, the display apparatus may include a display panel 100 and a display panel driver. The display panel driver may include a driving controller 200, a gate driver 300, a gamma reference voltage generator 400 and a data driver 500.

The display panel 100 may include a display area for displaying an image and a peripheral area disposed adjacent to the display area.

The display panel 100 may include a plurality of gate lines GL, a plurality of data lines DL, and a plurality of pixels electrically connected to each of the gate lines GL and the data lines DL. The gate lines GL extend in a first direction D1, and the data lines DL extend in a second direction D2 crossing the first direction D1.

In an embodiment, the pixels may be red pixels, green pixels and blue pixels. In addition, the pixels may be white pixels, magenta pixels, yellow pixels and cyan pixels.

The driving controller 200 may receive input image data IMG and an input control signal CONT from and external apparatus. The input image data IMG may be also referred to as an input image signal. In an embodiment, the input image data IMG may include red image data, green image data, and blue image data, for example. In an embodiment, the red image data R, the green image data G, and the blue image data B may have a gray scale of 0 to 255, for example. The gray scale of the input image data IMG may be represented by R, G, B. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling the operation of the gate driver 300 based on the input control signal CONT. The driving controller 200 may output the first control signal CONT1 to the gate driver 300. The first control signal CONT1 may include a vertical start signal and a gate clock signal.

The driving controller 200 may generate the second control signal CONT2 for controlling the operation of the data driver 500 based on the input control signal CONT. The driving controller 200 may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500. The data signal DATA may be image data which is substantially the same as the input image data IMG. The data signal DATA may be compensated image data which is generated by correcting the input image data IMG. In an embodiment, the driving controller 200 may selectively perform a quality correction, a spot correction, a color characteristic compensation (adaptive color correction ("ACC")) and/or a active capacitance compensation (dynamic capacitance compensation ("DCC")) for input image data IMG, such that the driving controller 200 may generate a data signal DATA, for example.

The driving controller 200 may generate the third control signal CONT3 for controlling the operation of the gamma reference voltage generator 400 based on the input control signal CONT. The driving controller 200 may output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to the data signal DATA.

In an embodiment, the gamma reference voltage generator 400 may be disposed in the driving controller 200 or in the data driver 500, for example.

The data driver 500 may receive the second control signal CONT2 and the data signal DATA from the driving controller 200, and the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
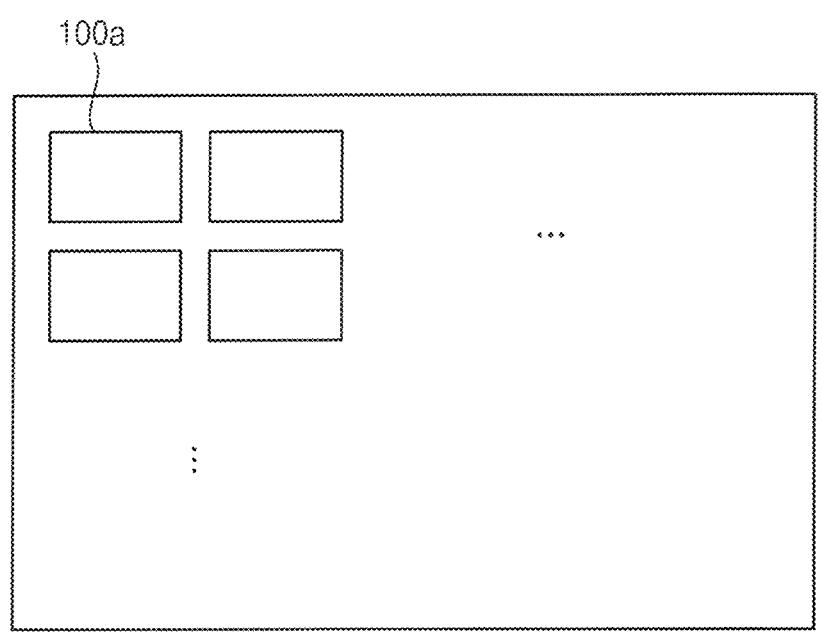
FIG. 2 is a diagram illustrating an embodiment of a display region of a tiled display apparatus including a plurality of sub display panels according to the invention.

FIG. 2 is a diagram illustrating an embodiment of a display region of a tiled display apparatus including a plurality of sub display panels according to the invention. The tiled display apparatus may be a large display apparatus in which several display apparatuses are integrated to represent an ultra-high resolution image which cannot be represented on a single display apparatus.

Referring to FIGS. 1 and 2, the sub display apparatus may be one of the sub display apparatuses constituting the tiled display. Here, the display panel 100 included in the display apparatus may be one of display panels constituting a display region of a tiled display. In an embodiment, the display panel 100 may be one of the sub display panels 100a of the tiled display, for example.

Figure 3:
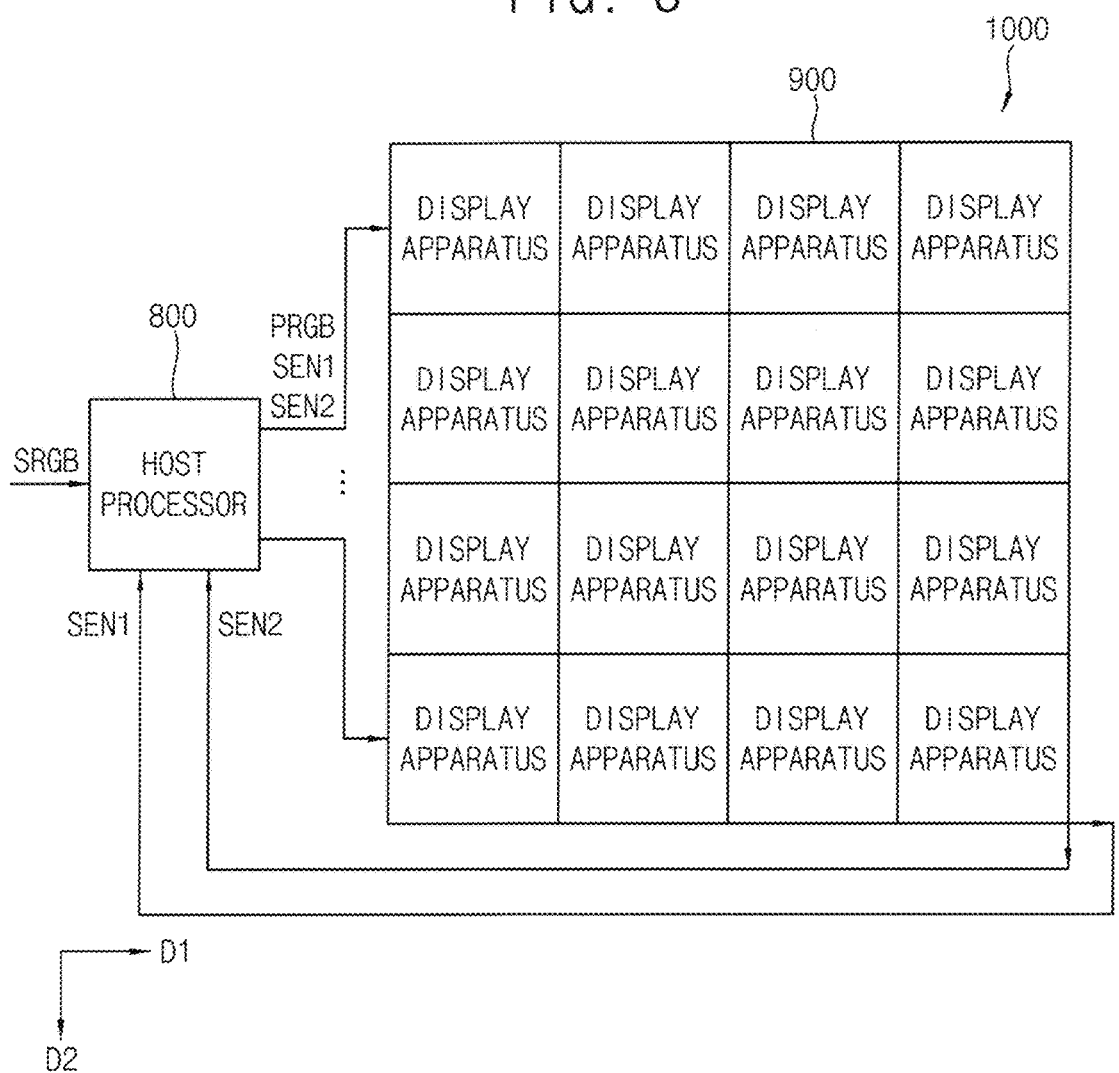
FIG. 3 is a block diagram illustrating an embodiment of a display system according to the invention.

FIG. 3 is a block diagram illustrating an embodiment of a display system 1000 according to the invention.

Referring to FIG. 3, the display system 1000 may include the sub display apparatuses 900 and a host processor 800 providing image data PRGB to the sub display apparatuses 900. In an embodiment, each of the sub display apparatuses 900 may be the display apparatus of FIG. 1. In addition, in an embodiment, the display system 1000 may be the tiled display apparatus in which the sub display apparatuses 900 are arranged in a tiled shape.

In an embodiment, the display system 1000, which is the tiled display apparatus including the sub display apparatuses 900, may be an electronic apparatus such as a digital television, a three-dimensional 3D television ("TV"), a personal computer ("PC"), a home electronic apparatus, and a laptop computer.

The sub display apparatuses 900 may be arranged in a tiled form or a matrix form. Although an arrangement of the sub display apparatuses 900 are illustrated as a 4×4 matrix form in the illustrated embodiment, the invention may not be limited thereto. In an embodiment, the sub display apparatuses 900 may be arranged in an I×J matrix form, for example. Herein, I is a positive integer and J is a positive integer. In addition, the sub display apparatuses 900 may be detachable from each other.

The host processor 800 may receive source image data SRGB. In an embodiment, the host processor 800 may receive the source image data SRGB which are broadcasted from an external device (e.g., a station) outside the display system 1000 or may receive the source image data SRGB from a memory device inside the display system 1000, for example. In addition, the host processor 800 may divide the source image data SRGB into sub input image data PRGB corresponding to the sub display apparatuses 900, and may provide sub input image data PRGB to the sub display apparatuses 900. In an embodiment, the host processor 800 and the sub display apparatuses 900 may be connected in a multi-drop method, and the host processor 800 may output corresponding sub input image data PRGB to the sub display apparatuses 900, for example.

In an embodiment, the host processor 800 may include sub input image data lines. The host processor 800 may be connected to the sub display apparatuses 900 through the sub input image data lines. In an embodiment, the host processor 800 may output the corresponding sub input image data PRGB to the sub display apparatuses 900 through the sub input image data lines, for example. The host processor 800 may sense information of the sub display apparatuses 900 through the sub input image data lines. The host processor 800 may determine the number of sub display apparatuses 900 based on the information of the sub display apparatuses 900. The host processor 800 may divide the source image data SRGB into the sub input image data PRGB according to the number of the sub display apparatuses 900.

Figure 4:
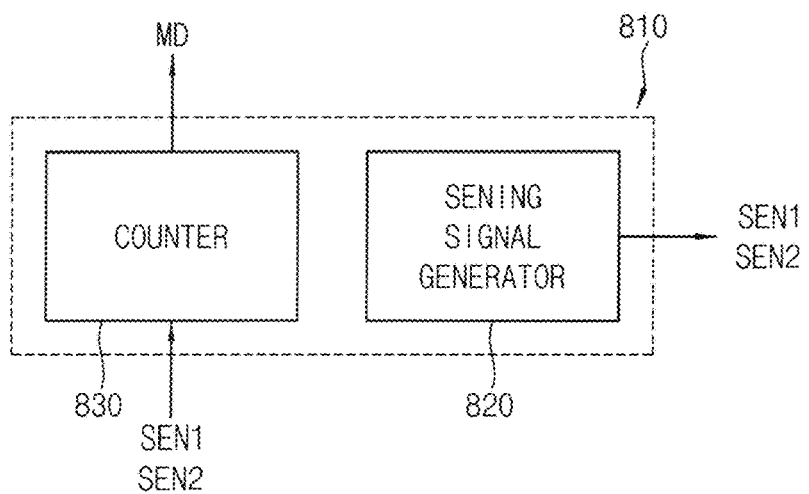
FIG. 4 is a block diagram illustrating a data generator included in the display system of FIG. 3.
Figure 5:
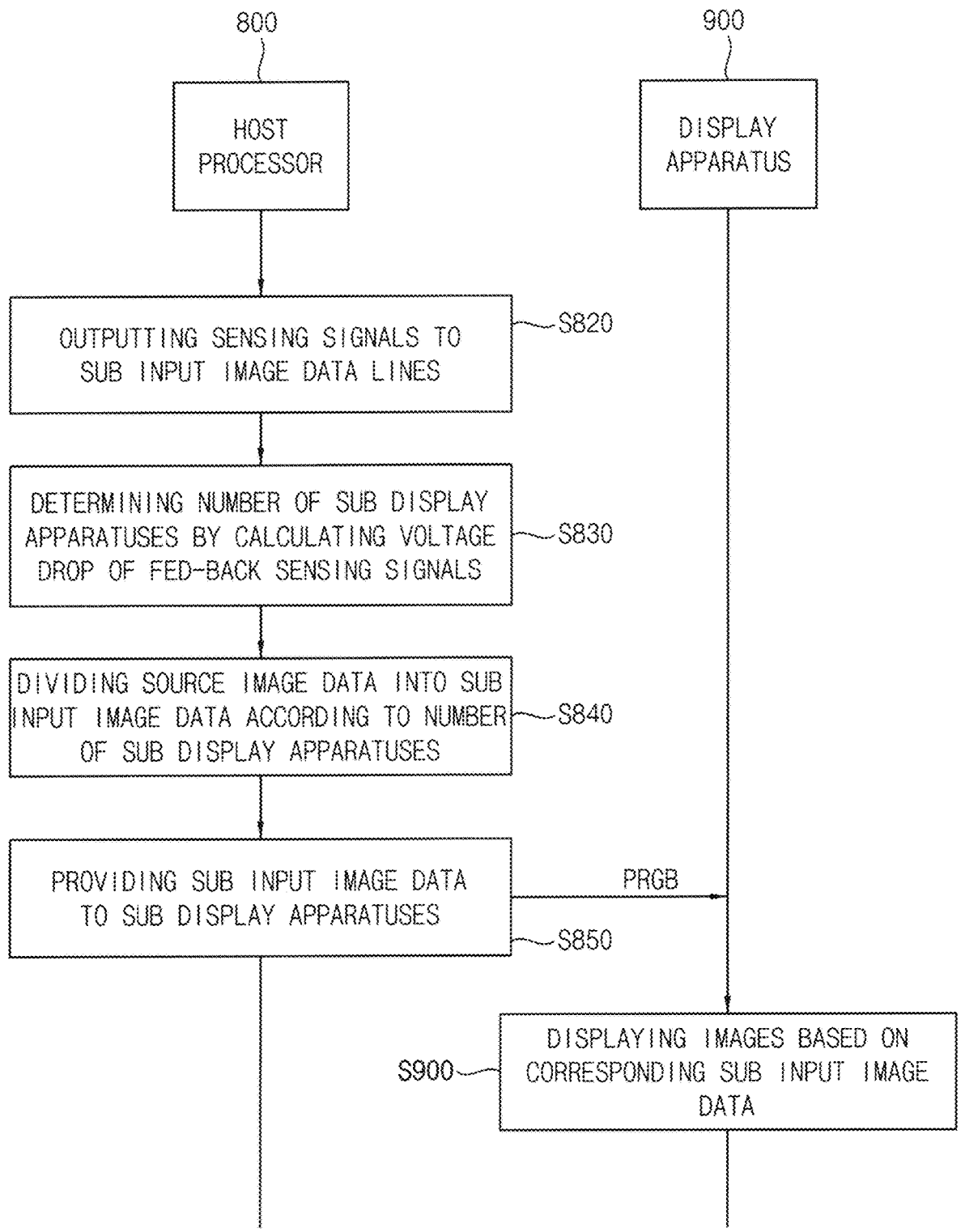
FIG. 5 is a flowchart illustrating an operation of the display system of FIG. 3.

FIG. 4 is a block diagram illustrating a data generator 810 included in the display system 1000 of FIG. 3. FIG. 5 is a flowchart illustrating an operation of the display system 1000 of FIG. 3.

Referring to FIGS. 3 to 5, the display system 1000 may include the data generator 810 generating data of the sub display apparatuses 900. The data generator 810 may include a sensing signal generator 820 and a counter 830. In an embodiment, the data generator 810 may be disposed in the host processor 800 and may be a component of the host processor 800. In another embodiment, the data generator 810 may be disposed out of the host processor 800 and output the data of the sub display apparatuses 900 to the host processor 800.

In general, the tiled display apparatus may use a graphic card to divide the source image data SRGB into sub input image data PRGB outputted to the sub display apparatuses 900. When the tiled display apparatus uses the graphic card, a manufacturing time of the tiled display apparatus may be increased and a power consumption of the tiled display apparatus may be increased. To solve this problem, the display system 1000 of the invention may sense the information of the sub display apparatuses 900 through the sub input image data lines, and may determine the number of the sub display apparatuses 900 based on the information of the sub display apparatuses 900. The host processor 800 may divide the source image data SRGB into the sub input image data PRGB according to the number of the sub display apparatuses 900.

In an embodiment, the sensing signal generator 820 may output sensing signals to sub input image data lines (operation S820), for example. The counter 830 may determine the number of the sub display apparatuses 900 by calculating a voltage drop of fed-back sensing signals (operation S830). Here, the host processor 800 may divide the source image data SRGB into the sub input image data PRGB according to the number of the sub display apparatuses 900 (operation S840), and the host processor 800 may provide the sub input image data PRGB to the sub display apparatuses 900 (operation S850). The sub display apparatuses 900 may display images based on the corresponding sub input image data PRGB (operation S900).

The sensing signal generator 820 may output the sensing signals to the sub input image data lines (operation S820). In an embodiment, the sub display apparatuses 900 may be arranged in a form of I×J matrix. Herein, I may be a positive integer equal to or greater than 1 and J may be a positive integer equal to or greater than 1. The sensing signal generator 820 may output a first sensing signal SEN1 in the first direction D1 of the sub input image data line, and may output a second sensing signal SEN2 in the second direction D2 perpendicular to the first direction D1. The first sensing signal SEN1 may be input to I sub display apparatuses 900 disposed in the first direction D1, and may be fed back to the counter 830. The second sensing signal SEN2 may be input to J sub display apparatuses 900 disposed in the second direction D2, and may be fed back to the counter 830.

The counter 830 may determine the number of the sub display apparatuses 900 by calculating a voltage drop of the fed-back sensing signals (operation S830). Here, the fed-back sensing signals may be the first sensing signal SEN1 and the second sensing signal SEN2 which are output to the sub input image data lines. The first sensing signal SEN1 and the second sensing signal SEN2 may be fed-back to the counter 830. A voltage drop may occur as the first sensing signal SEN1 passes through the I sub display apparatus 900. The counter 830 may determine a value of I by dividing amount of the voltage drop of the first sensing signal SEN1 by a resistance of the sub display apparatuses 900. A voltage drop may occur as the second sensing signal SEN2 passes through the J sub display apparatus 900. The counter 830 may determine a value of J by dividing amount of the voltage drop of the second sensing signal SEN2 by the resistance of the sub display apparatuses 900. The counter 830 may generate I×J matrix data MD based on the value of I and the value of J.

The host processor 800 may divide the source image data SRGB into the sub input image data PRGB according to the number of the sub display apparatuses 900 (operation S840). In an embodiment, the host processor 800 may receive the I×J matrix data MD and may determine the sub input image data PRGB by dividing the source image data SRGB according to the number of sub display apparatuses 900 so that the sub display apparatuses 900 may display one large image corresponding to the source image data SRGB, for example.

The host processor 800 may provide the sub input image data PRGB to the sub display apparatuses 900 (operation S850) without a graphic card. The sub display apparatuses 900 may display images based on the corresponding sub input image data PRGB (operation S900). Accordingly, the graphic card may not be disposed (e.g., mounted) on the host processor 800 in the display system 1000 so that a manufacturing time of the display system 1000 may be shortened and the power consumption of the display system 1000 may be reduced in the display system 1000.

Figure 6:
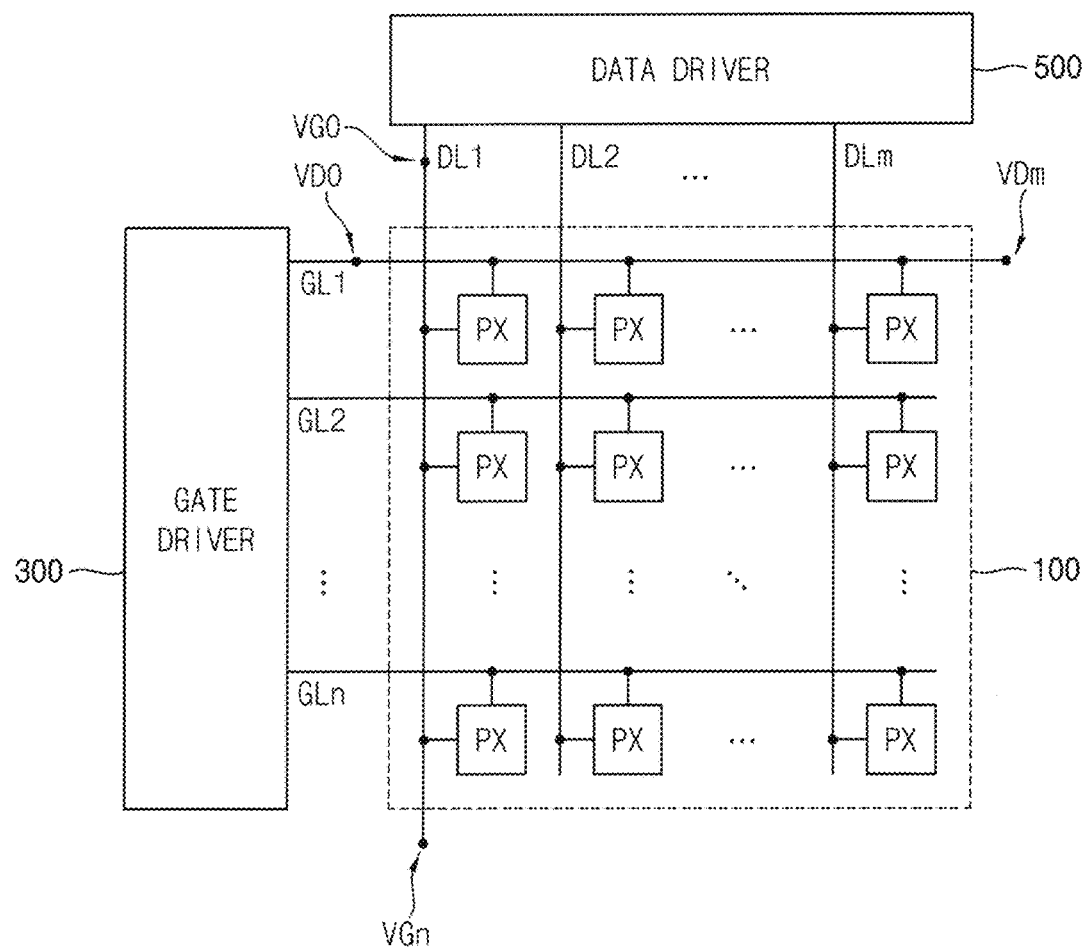
FIG. 6 is a block diagram illustrating a part of a sub display apparatus.

FIG. 6 is a block diagram illustrating a part of the sub display apparatuses 900.

Referring to FIGS. 1, 3, and 6, the sub display apparatus 900 may be one of the sub display apparatuses 900 constituting the tiled display. In an embodiment, the display apparatus of FIG. 1 may be one of the sub display apparatuses 900 of the tiled display apparatus of FIG. 3, for example.

The sub display apparatuses 900 may include gate lines GL and data lines DL. The gate lines GL may extend in the first direction D1, and the data lines DL may extend in the second direction D2. The gate lines GL may include a first gate line GL1 to an n-th gate line GLn. The data lines DL may include a first data line DL1 to an m-th data line DLm. The gate lines GL may have an initial gate node and a final gate node. The initial gate node may have initial data voltage VD0, and the final gate node may have final data voltage VDm. The data lines DL may have an initial data node and a final data node. The initial data node may have gate initial voltage VG0, and the final data node may have final gate voltage VGn. The pixels PX included in the sub display apparatuses 900 may be arranged in a form of n×m matrix. Herein, n may be a positive integer equal to or greater than 1 and m may be a positive integer equal to or greater than 1. The pixels PX may have a predetermined resistance.

Figure 7:
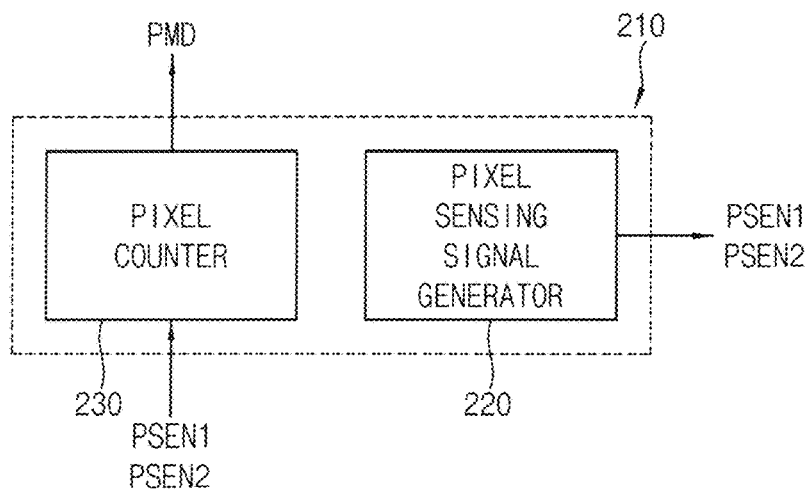
FIG. 7 is a block diagram illustrating a pixel data generator included in the sub display apparatus.
Figure 8:
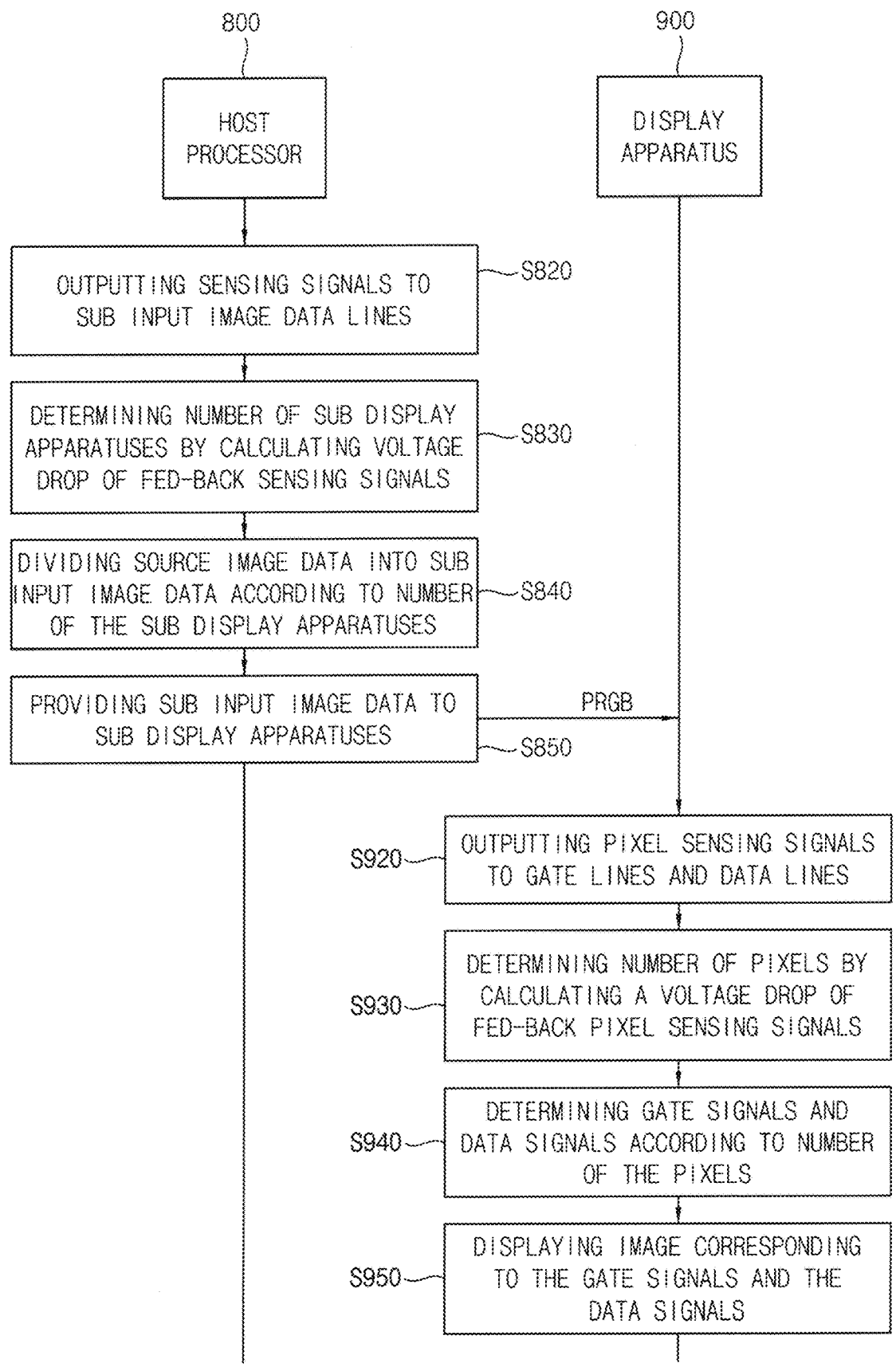
FIG. 8 is a flowchart illustrating operations of the pixel data generator of FIG. 7 and the display system.

FIG. 7 is a block diagram illustrating a pixel data generator 210 included in the sub display apparatus 900. FIG. 8 is a flowchart illustrating operations of the pixel data generator 210 of FIG. 7 and the display system 1000.

Referring to FIGS. 3 to 8, the sub display apparatuses 900 may include the pixel data generator 210 generating data of the pixels PX. The pixel data generator 210 may include a pixel sensing signal generator 220 and a pixel counter 230. In an embodiment, the pixel data generator 210 may be arranged inside the driving controller 200 and may be a component of the driving controller 200. In another embodiment, the pixel data generator 210 may be arranged outside the driving controller 200 and may output the data of the pixels PX to the driving controller 200.

In general, the sub display apparatuses 900 may uses the graphic card to divide the gate signals and the data signals. When the sub display apparatuses 900 uses the graphic card, a manufacturing time of the sub display apparatuses 900 may be increased and a power consumption of the sub display apparatuses 900 may be increased. To solve this problem, the sub display apparatuses 900 of the invention may sense information of the pixels PX through the gate lines GL and the data lines DL, and may determine the number of the pixels PX based on the information of the pixels PX. The driving controller 200 may determine the gate signals and the data signals according to the number of the pixels.

In an embodiment, the sensing signal generator 820 may output sensing signals to the sub input image data lines (operation S820), for example. The counter 830 may determine the number of the sub display apparatuses 900 by calculating a voltage drop of the fed-back sensing signals (operation S830). Here, the host processor 800 may divide the source image data SRGB into the sub input image data PRGB according to the number of the sub display apparatuses 900 (operation S840), and the host processor 800 may provide the sub input image data PRGB to the sub display apparatuses 900 (operation S850). The pixel sensing signal generator 220 may output pixel sensing signals to the gate lines GL and the data lines DL (operation S920). The pixel counter 230 may determine the number of the pixels PX by calculating a voltage drop of fed-back pixel sensing signals (operation S930). The driving controller 200 may determine the gate signals and the data signals according to the number of the pixels. (operation S940). The sub display apparatuses 900 may display an image corresponding to the gate signals and the data signals (operation S950).

The sensing signal generator 820 may output the sensing signals to the sub input image data lines (operation S820). In an embodiment, the sub display apparatuses 900 may be arranged in a form of I×J matrix. Herein, I may be a positive integer equal to or greater than 1 and J may be a positive integer equal to or greater than 1. The sensing signal generator 820 may output a first sensing signal SEN1 in a first direction D1 of the sub input image data line, and may output a second sensing signal SEN2 in a second direction D2 perpendicular to the first direction D1. The first sensing signal SEN1 may be input to I sub display apparatuses 900 disposed in the first direction D1, and may be fed back to the counter 830. The second sensing signal SEN2 may be input to the J sub display apparatuses 900 arranged in the second direction D2, and may be fed back to the counter 830. The counter 830 may determine the number of the sub display apparatuses 900 by calculating a voltage drop of the fed-back sensing signals (operation S830). Here, the fed-back sensing signals may be the first sensing signal SEN1 and the second sensing signal SEN2 which are output to the sub input image data lines. The first sensing signal SEN1 and the second sensing signal SEN2 may be fed-back to the counter 830. A voltage drop may occur as the first sensing signal SEN1 passes through the I sub display apparatus 900. The counter 830 may determine a value of I by dividing amount of the voltage drop of the first sensing signal SEN1 by the resistance of the sub display apparatuses 900. A voltage drop may occur as the second sensing signal SEN2 passes through the J sub display apparatus 900. The counter 830 may determine a value of J by dividing amount of the voltage drop of the second sensing signal SEN2 by the resistance of the sub display apparatuses 900. The counter 830 may generate I×J matrix data MD based on the value of I and the value of J.

The host processor 800 may divide the source image data SRGB into the sub input image data PRGB according to the number of the sub display apparatuses 900 (operation S840). In an embodiment, the host processor 800 may receive the I×J matrix data MD and may determine the sub input image data PRGB by dividing the source image data SRGB according to the number of sub display apparatuses 900 so that the sub display apparatuses 900 may display one large image corresponding to the source image data SRGB, for example.

The host processor 800 may provide the sub input image data PRGB to the sub display apparatuses 900 (operation S850) without a graphic card. The sub display apparatuses 900 may display images based on the corresponding sub input image data PRGB (operation S900). Accordingly, the graphic card may not be disposed (e.g., mounted) on the host processor 800 in the display system 1000 so that a manufacturing time of the display system 1000 may be shortened and the power consumption of the display system 1000 may be reduced in the display system 1000.

The pixel sensing signal generator 220 may output pixel sensing signals to the gate lines GL and the data lines DL (operation S920). In an embodiment, the gate lines GL may include the first gate line GL1 to the n-th gate line GLn, for example. The pixel sensing signal generator 220 may output a first pixel sensing signal PSEN1 to the gate lines GL. The gate lines GL may be connected to m pixels PX. In another embodiment, the data lines DL may include the first data line DL1 to the m-th data line DLm, for example. The pixel sensing signal generator 220 may output a second pixel sensing signal PSEN2 to the data lines DL. The data lines DL may be connected to n pixels PX. The first pixel sensing signal PSEN1 and the second pixel sensing signal PSEN2 may be fed-back and input to the pixel counter 230.

The pixel counter 230 may determine the number of pixels PX by calculating a voltage drop of the fed-back pixel sensing signals (operation S930). Here, the fed-back pixel sensing signals may be the first pixel sensing signal PSEN1 which is output to the gate lines GL and the second pixel sensing signal PSEN2 which is output to the data lines DL. The first pixel sensing signal PSEN1 and the second pixel sensing signal PSEN2 may be fed-back and input to the pixel counter 230. In an embodiment, the gate lines GL may have an initial gate node and a final gate node, for example. The initial gate node may have the initial data voltage VD0, and the final gate node may have the final data voltage VDm. A voltage drop may occur as the first pixel sensing signal PSEN1 passes through the m pixels PX. The pixel counter 230 may determine a value of m by dividing amount of the voltage drop of the first pixel sensing signal PSEN1 by the predetermined resistance of the pixels PX. In an embodiment, when the predetermined resistance of the pixels PX is Rp, the number of the pixels PX in the first direction D1 (e.g., m pixels) may be determined by dividing the difference between the final data voltage VDm and the initial data voltage VD0 by the predetermined resistance of the pixels Rp (e.g., m=(VDm-VD0)/Rp), for example. The data lines DL may have an initial data node and a final data node. The initial data node may have the initial gate voltage VG0, and the final data node may have the final gate voltage VGn. A voltage drop may occur as the second pixel sensing signal PSEN2 passes through the n pixels PX. The pixel counter 230 may determine a value of n by dividing amount of the voltage drop of the second pixel sensing signal PSEN2 by the predetermined resistance of the pixels PX. In an embodiment, when the predetermined resistance of the pixels PX is Rp, the number of the pixels PX in the second direction D2 (e.g., n pixels) may be determined by dividing the difference between the final gate voltage VGn and the initial gate voltage VG0 by the predetermined resistance of the pixels Rp (e.g., n=(VGn-VG0)/Rp), for example. The pixel counter 230 may generate m×n matrix data PMD based on the value of m and the value of n.

The driving controller 200 may determine the gate signals and the data signals according to the number of the pixels (operation S940). The sub display apparatuses 900 may display an image corresponding to the gate signals and the data signals (operation S950). Accordingly, the graphic card may not be disposed (e.g., mounted) on driving controller 200 in the sub display apparatuses 900 so that a manufacturing time of the sub display apparatuses 900 may be shortened and the power consumption of the sub display apparatuses 900 may be reduced in the sub display apparatuses 900.

Figure 9:
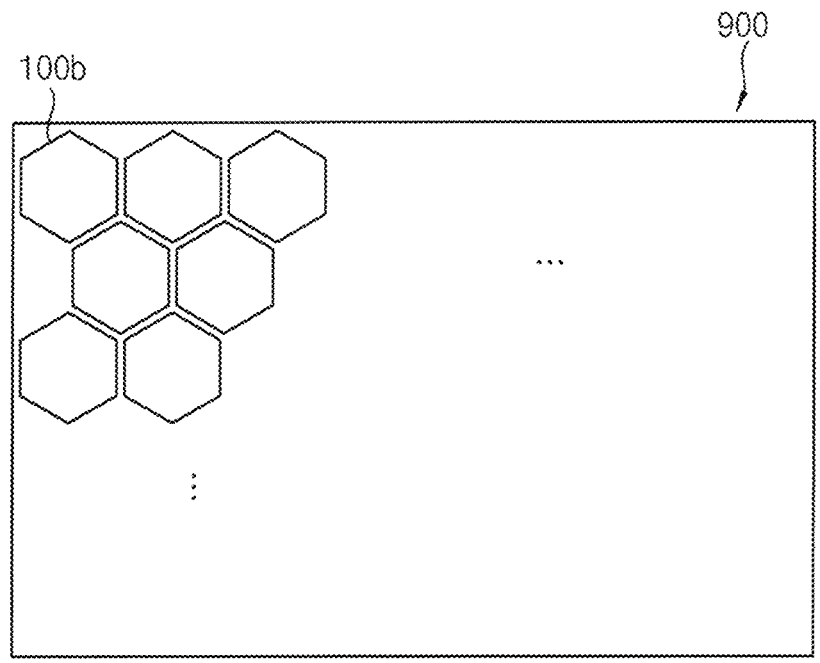
FIG. 9 a diagram illustrating an embodiment of a display region of a tiled display apparatus including a plurality of sub display panels according to the invention.

FIG. 9 a diagram illustrating an embodiment of a display region of a tiled display apparatus including a plurality of sub display panels 100 (refer to FIG. 1) according to the invention.

Referring to FIG. 9, the sub display panels 100 included in the sub display apparatus 900 may have a shape of non-rectangle. In an embodiment, the sub display panels 100 may be a regular hexagonal sub display panel 100b, for example. However, the invention is not limited thereto. In an embodiment, the sub display panel 100 may have various shapes such as a triangle, a square, and a circle in the embodiments. As such, when the sub display panels 100 have a shape of non-rectangle, a tiled display apparatus may be manufactured in various shapes.

Figure 10:
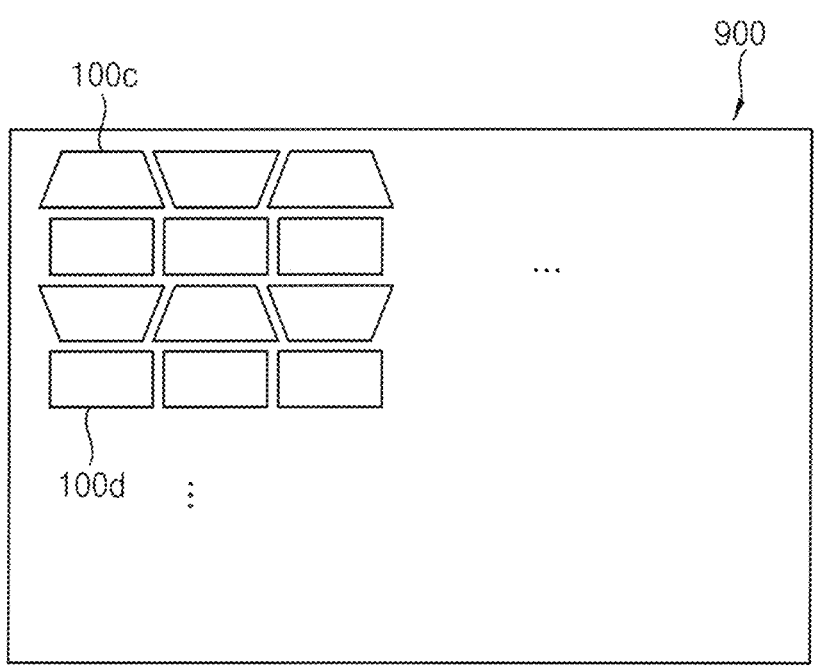
FIG. 10 a diagram illustrating an embodiment of a display region of a tiled display apparatus including a plurality of sub display panels according to the invention.

FIG. 10 a diagram illustrating an embodiment of a display region of a tiled display apparatus including a plurality of sub display panels 100 (refer to FIG. 1) according to the invention.

Referring to FIG. 10, the sub display panel 100 of at least one of the sub display apparatuses 900 may have a shape different from the sub display panel 100 of another sub display apparatus 900. In an embodiment, the sub display panels 100 may include first sub display panels 100c of a first shape and second sub display panels 100d of a second shape different from the first shape, for example. However, the invention is not limited thereto. In an embodiment, the sub display panels 100 may have more various types of shapes, for example. When the sub display panels 100 have different shapes as described above, the shape of the tiled display apparatus may be freely deformed.

A tiled display apparatus may display an ultra-high resolution image which cannot be represented on a single display apparatus by integrating several display apparatus. However, when the sub display panels 100 included in the tiled display apparatus are manufactured only in a quadrangular (e.g., rectangular) shape, the tiled display apparatus may be difficult to manufacture in various forms and may have limitations in shape deformation. In order to solve this problem, the display system 1000 may include sub display panels 100 of various shapes and types. At the same time, the display system 1000 may determine the number of sub display apparatuses 900 through sub-input image data lines included in the display system 1000, and may provide the sub input image data PRGB to the sub display apparatuses 900 without a graphic card.

Embodiments of the invention may be applied to a display apparatus and various apparatuses and systems including the same. Accordingly, the invention may be usefully used in various electronic apparatuses such as a mobile phone, a smart phone, a personal digital assistant ("PDA"), a portable media player ("PMP"), a digital camera, a camcorder, a PC, a server computer, a workstation, a notebook computer, a digital TV, a set-top box, a music player, a portable game console, a navigation system, a smart card, a printer.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention.

Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the predetermined embodiments disclosed, and that modifications to the disclosed embodiments, as well as other embodiments, can be made within the scope of the invention.

What is claimed is:

1. A display system comprising:
a display region including a plurality of sub display apparatuses, a sub display apparatus of the plurality of sub display apparatuses comprising:
a sub display panel including a plurality of pixels; and
a panel driver; and
a host processor which divides source image data into a plurality of sub input image data corresponding to the plurality of sub display apparatuses, and provides the sub input image data to the plurality of sub display apparatuses, the host processor including:
a data generator including a counter,
wherein the panel driver receives corresponding sub input image data among the plurality of sub input image data and drives the sub display panel based on the corresponding sub input image data,
the data generator senses information of the plurality of sub display apparatuses included in the display region and determines a number of the plurality of sub display apparatuses, and
the data generator includes a sensing signal generator which outputs a first sensing signal in a first direction of the display region and outputs a second sensing signal in a second direction perpendicular to the first direction, and
the counter receives the first sensing signal and the second sensing signal, calculates a voltage drop of the first sensing signal and a voltage drop of the second sensing signal and determines the number of the plurality of sub display apparatuses included in the display region based on the voltage drop of the first sensing signal and the voltage drop of the second sensing signal.

2. The display system of claim 1, wherein the host processor determines the plurality of sub input image data according to the number of the plurality of sub display apparatuses.

3. The display system of claim 2, wherein the sub display apparatus further includes a gate line which transmits a gate signal, a data line which transmits a data signal, and a pixel data generator which senses information of the plurality of pixels through the gate line and the data line and determines a number of the plurality of pixels.

4. The display system of claim 3, wherein the sub display apparatus determines the gate signal and the data signal according to the number of the plurality of pixels.

5. The display system of claim 3, wherein the pixel data generator outputs a first pixel sensing signal to the gate line, receives the first pixel sensing signal, calculates a voltage drop of the first pixel sensing signal and determines a number of pixels of the plurality of pixels in the first direction of the sub display panel.

6. The display system of claim 5, wherein the pixel data generator outputs a second pixel sensing signal to the data line, receives the second pixel sensing signal, calculates a voltage drop of the second pixel sensing signal and determines a number of pixels of the plurality of pixels in the second direction of the sub display panel.

7. The display system of claim 1, wherein the sub display panel has a shape of non-rectangle.

8. The display system of claim 1, wherein the sub display panel of at least one of the plurality of sub display apparatuses has a shape different from a shape of the sub display panel of another sub display apparatus of the plurality of sub display apparatuses.

9. A method of driving a display system, the method comprising:
sensing information of a plurality of sub display apparatuses included in a display region in a first direction and a second direction;
determining a number of the plurality of sub display apparatuses;
dividing source image data into a plurality of sub input image data corresponding to the plurality of sub display apparatuses; and
providing the plurality of sub input image data to corresponding sub display apparatuses of the plurality of sub display apparatuses,
wherein the sub display apparatus includes a sub display panel including a plurality of pixels and a panel driver which receives corresponding sub input image data among the plurality of sub input image data and drives the sub display panel based on the corresponding sub input image data, and
the sensing the information of the sub display apparatus comprises outputting a first sensing signal in a first direction of the display region and a second sensing signal in a second direction perpendicular to the first direction, and
the determining the number of the plurality of sub display apparatuses comprises receiving the first sensing signal and the second sensing signal and calculating a voltage drop of the first sensing signal and a voltage drop of the second sensing signal.

10. The method of claim 9, further comprising:
determining the plurality of sub input image data according to the number of the plurality of sub display apparatuses.

11. The method of claim 10, wherein the sub display apparatus includes a gate line which transmits a gate signal, a data line which transmits a data signal, and a pixel data generator which senses information of the plurality of pixels through the gate line and the data line and determine a number of the plurality of pixels.

12. The method of claim 11, wherein the sub display apparatus determines the gate signal and the data signal according to the number of the plurality of pixels.

13. The method of claim 11, wherein the pixel data generator outputs a first pixel sensing signal to the gate line, receives the first pixel sensing signal, calculates a voltage drop of the first pixel sensing signal, and determines a number of pixels of the plurality of pixels in the first direction of the sub display panel.

14. The method of claim 13, wherein the pixel data generator outputs a second pixel sensing signal to the data line, receives the second pixel sensing signal, calculates a voltage drop of the second pixel sensing signal and determines a number of pixels of the plurality of pixels in the second direction of the sub display panel.

15. The method of claim 9, wherein the sub display panel has a shape of non-rectangle.

16. The method of claim 9, wherein the sub display panel of at least one of the plurality of sub display apparatuses has a shape different from a shape of the sub display panel of another sub display apparatus.

\* \* \* \* \*